June 19, 1928.  W. I. RUBOVITS  1,674,066
SOAP DISH
Filed Feb. 27, 1925
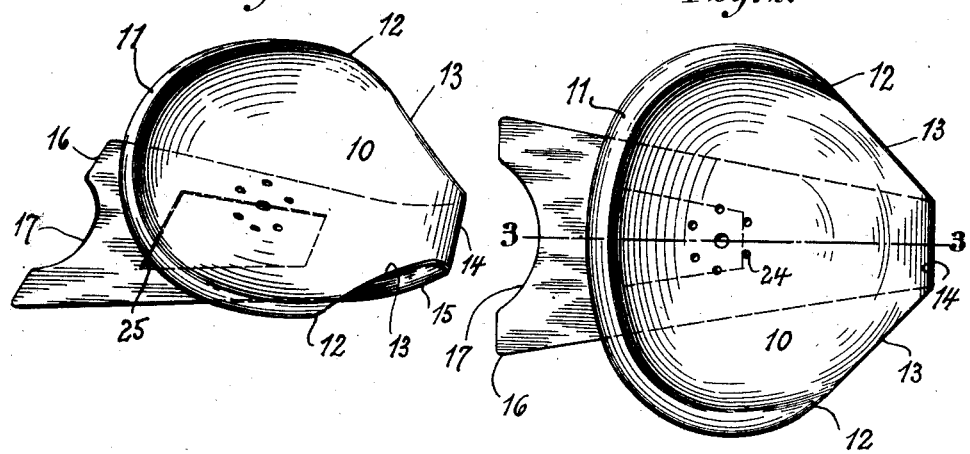
INVENTOR
Walter I. Rubovits
BY C. P. Goepel
ATTORNEY.

Patented June 19, 1928.

1,674,066

UNITED STATES PATENT OFFICE.

WALTER ISAAC RUBOVITS, OF CHICAGO, ILLINOIS.

SOAP DISH.

Application filed February 27, 1925. Serial No. 11,944.

This invention relates to soap dishes, and has for its object to provide a simple, expedient, and readily attachable soap dish.

Heretofore, soap dishes were largely made part of washstands, and the objection thereto is that they are used by successive users of soaps, and present the ever present danger of germ transmitters. My invention overcomes these defects and provides an individual soap dish readily carried by the user, and readily attached to any washstand.

For this purpose my invention consists of an individual soap dish having a soap holding member and means enabling it to be readily attached to a washstand.

The invention will be more fully described hereinafter, shown in the drawings and finally set forth in the claim.

In the accompanying drawings,—

Figure 1 is a perspective view of a soap dish embodying my invention;

Fig. 2 is a plan view;

Fig. 3 is a longitudinal section on line 3—3 of Fig. 2;

Fig. 4 is a sectional view of a washstand showing one manner of attaching my soap dish thereto.

Fig. 5 is a similar view, showing another way of attachment.

Fig. 6 is a perspective view of the soap dish in another position,

Fig. 7 is a side view showing a manner of supporting the dish in the position indicated in Fig. 6, and;

Figs. 8 and 9 show how the dish may be modified by bending a portion of it so as to support it in another way.

Similar reference characters designate corresponding parts throughout the various views.

Referring to the drawings, the individual soap dish has a bowl portion 10 of shell form with an open face, and suitably shaped to hold a piece of soap. The portion 10 is provided with a rim 11 which extends a little more than half way around the bowl portion 10, said rim terminating at 12. Forward of the rim terminals 12 downwardly inclined portions 13 merge into a front portion 14, which is integral with a bent over strip 15 which extends rearwardly and below the bowl portion preferably widening in shape, and being provided at its end 16 with a recess 17 to enable the strip to engage at its recess against a pipe 20 as shown in Fig. 4. The strip 15 extends as shown in Figs. 2 and 3 beyond the edge of the bowl portion. The strip itself is flat to enable it readily to be pushed beneath a fixture as in Fig. 4, or into a crack 21 of the washstand, between the vertical and horizontal marble slabs 22 and 23 thereof as shown in Fig. 5. The bowl portion is preferably provided with strainer openings 24, to allow the water to drain off from the soap. Preferably also the strip 15 is provided with a cut out 25 to reduce the weight of the soap holder and for the purpose to be hereinafter described. The rim 11 is bent over and extends down as at 19 in Fig. 3 to strengthen the bowl portion.

Referring to Figs. 6 and 7, the soap dish is shown in another and preferred position. In this position it will be seen that the strainer portion of the bowl is immediately above the cut out 25 in the strip 15 so that when the dish is used in this position, the soap drippings will not touch the holder strip but drain through to the bowl. As indicated in Fig. 7 the dish may be supported between the faucet 24 and wall 22 of the bowl to the rear thereof, in which position the recess portion 17 in the bottom of the strip 15 serves to engage the bottom of the faucet to aid in supporting the dish. Obviously, the dish might be supported between the wall to the rear of the drain plug of the lavatory or other fittings of a similar character; the recessed portion 17 serves to more securely position the dish in such a position.

In Figs. 8 and 9 the soap dish is shown with the strip 15 bent outwardly so as to be at substantially right angles with the bowl portion thereof. With the supporting strip bent in this relation to the bowl portion, it is adapted to be positioned between the back of the sink or similar construction 25 and the wall as indicated in Fig. 8 or between the faucet 26 and a supporting wall 27 therefor as shown in Fig. 9.

My improved soap dish may be readily manufactured in that the preferable form thereof is of one piece and thus can be stamped out of metal and thereafter bent into shape. The use of it affords many advantages in that the individual user can carry on his travels his individual soap dish and then readily apply it in hotel rooms or wash rooms of railroads, thus freeing himself of the danger of infection from dangerous and contagious germs.

Various modifications can be made to the embodiments shown in the drawings as hereinbefore described without departing from the spirit of the invention as defined in the appended claim.

I claim:

A soap dish comprising a single piece of metal shaped at one end to form a bowl portion, the intermediate portion of the piece of metal being bent from one edge of the bowl portion beneath the latter and in divergent relation thereto, said bowl portion having drain openings in the bottom thereof, and the bent portion of the piece of metal having an opening therethrough beneath the drain openings in the bowl portion and extending beyond the bowl and having a notch in its end to seat against a lavatory fixture.

In testimony that I claim the foregoing as my invention, I have signed my name hereto.

WALTER ISAAC RUBOVITS